April 29, 1969   A. ROLON   3,441,949
LASER BEAM RECORDER WITH DUAL MEANS TO COMPENSATE FOR
CHANGE IN ANGULAR VELOCITY OF SWEPT BEAM
Filed April 17, 1967   Sheet 1 of 3

ARNALDO ROLON
INVENTOR.

BY William E. Johnson Jr.
ATTORNEY.

ARNALDO ROLON
INVENTOR.

BY William E. Johnson Jr.
ATTORNEY.

TIMING GENERATOR

ARNALDO ROLON
INVENTOR.

United States Patent Office 3,441,949
Patented Apr. 29, 1969

3,441,949
LASER BEAM RECORDER WITH DUAL MEANS TO COMPENSATE FOR CHANGE IN ANGULAR VELOCITY OF SWEPT BEAM
Arnaldo Rolon, Houston, Tex., assignor to Dresser Systems, Inc., a corporation of Delaware
Filed Apr. 17, 1967, Ser. No. 631,269
Int. Cl. G01d 9/42
U.S. Cl. 346—108                    1 Claim

ABSTRACT OF THE DISCLOSURE

A controlled laser beam is deflected by a rotating mirror onto a parabolic mirror to a photographic film, the parabolic mirror providing partial compensation for the nonlinear effect of sweeping the flat surface of the film with a light beam.

---

This invention relates to high speed data plotters. In particular, it relates to systems for transferring computer information to a photographic film, wherein a laser beam is controlled and subsequently deflected by a rotating mirror and a parabolic mirror onto the film.

A high speed "on-line" plotter for use for digital computers is generally considered a necessity by those in the computer art. While the display of seismic information from a computer is one of the prime functions of the system according to the invention, a plotter designed for high speed seismic display from a digital computer also finds utilization for other displays, such as mechanical drawings, maps, and other graphic representations.

For general purpose use, a plotter must be capable of placing a light beam on a sensitized film within some established tolerance. The presently accepted standard for the positional tolerance of a single dot, being the smallest mark that can be put on film, is within approximately ±5 mils of the correct center. Thus, the resolution should be within 5 mils. As is well known in the art, the placement of a series or group of dots on a film produces almost any image.

A plotter should be capable of making variable density characters also. For example, a map often times requires shading of varying grade levels. The prior art has accomplished this to some extent by varying the intensity of a cathode ray tube or by using a half tone or dot density technique.

Because of the extreme rapidity with which a digital computer operates, a digital plotter must be relatively fast. Moving ink pen X—Y recorders, as sometimes used in the art, are an example of an extremely slow device for plotting computer output.

While the conventional CRT scanning process has been successful to some extent in rapid data plotting, it does have several disadvantages compared with the plotter according to the present invention, all of which will be discussed hereinafter. In co-pending application, Ser. No. 577,259, filed Sept. 6, 1966, now U.S. Patent No. 3,389,403, assigned to the assignee of the present invention, there is disclosed a method and apparatus for projecting a controlled laser beam onto a rotating mirror and further onto a film strip, including means for compensating for the difference in angular velocity of a laser beam while scanning the film strip. The present invention is drawn to an improvement on the methods and apparatus in said co-pending application.

It is therefore the primary object of this invention to provide a high speed, high resolution data plotter.

It is another object of the invention to provide a means for rapid data scanning.

It is yet another object of the invention to provide a means for rapid data scanning.

It is yet another object of the invention to provide a data plotter having means for deflecting a laser beam across a film strip to establish with accuracy the position and resolution of the individual bits of data information thereon.

It is still another object of the invention to provide means for compensating for the nonlinear effect of sweeping a flat surface with a light beam.

It is a specific object of the invention to provide a parabolic mirror for partially compensating for the nonlinear effect of sweeping a flat surface with a light beam.

The objects of the invention are accomplished, broadly, by controlling a laser beam and deflecting the beam by a rotating mirror onto a parabolic mirror and then onto a film strip. The laser beam is controlled by one or more pockel cells, the cells being controlled by data from a digital computer. After the laser beam has completed one scan across the film, the film is then stepped one position, approximately .005 inch, whereupon the laser unit makes its next scan across the film. Since the laser beam is controlled by information from the digital computer and the associated circuitry according to the invention, and because the laser beam is collimated, i.e., in the form of a pencil-like beam approximately .004 inch in diameter, a single scan of the laser beam produces a series of dots having 4 mil diameters across a longitudinal axis of the film. The location of the dots, being on 5 mil centers, is dependent upon the information from the computer and from the other information according to the invention.

Inherent in any system which utilizes a rotating scanning beam such as is used in this invention is the problem of the change in angular velocity of the beam, since the radius or distance from the mirror to the film is constantly changing. One of the features of this invention embodies means for circumventing this problem. This is done by providing a parabolic deflection system which partially compensates for the changes in angular velocity of the beam.

These and other objects, features, and advantages of the present invention will be apparent from the following detailed description taken with reference to the figures of the accompanying drawings, wherein the same or similar reference characters illustrate the same or similar parts:

FIGURE 1 of the drawings is a pictorial view of the laser assembly, pockel cell and lens housing according to the invention;

FIGURE 2 of the drawings is a pictorial representation of a laser device, rotating mirror, the parabolic mirror and the film and motor drive devices according to the invention. In addition, there is shown in block diagram the associated circuitry for driving and controlling the laser unit, the rotating mirror and the film mechanism;

Figure 1:
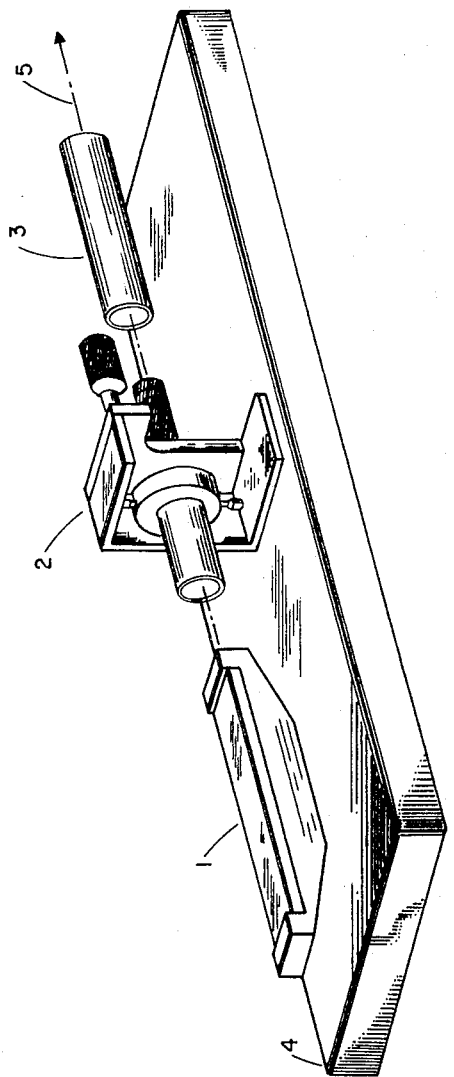

In the form of the present invention chosen for purposes of illustration in the drawings, FIGURE 1 shows a pictorial representation of the laser generating system 1 mounted on a granite block 4. The laser 1 is a continuous gas laser, model 170, operating at 6,328 angstroms, commercially available from Optics Technology Inc., 901 California Ave., Palo Alto, Calif. The light beam 5, which emits from laser 1 as a collimated beam .080 inch in diameter, passes through a conventional pockel cell into the lens tube housing 3, the pockel cell having electrical connections (not illustrated) thereon whereby the cell can either completely block the beam 5 or lessen its intensity for varying shades of gray. The controlled beam 5, after passing through the pockel cell 2, proceeds from the conventional lens housing 3 in the form of a collimated, pencil-like beam of .004 inch in diameter. It should be appreciated that the diameter is variable for the particular purpose, and that the diameter is chosen for the spot diameter eventually appearing on the film 7.

Figure 2:
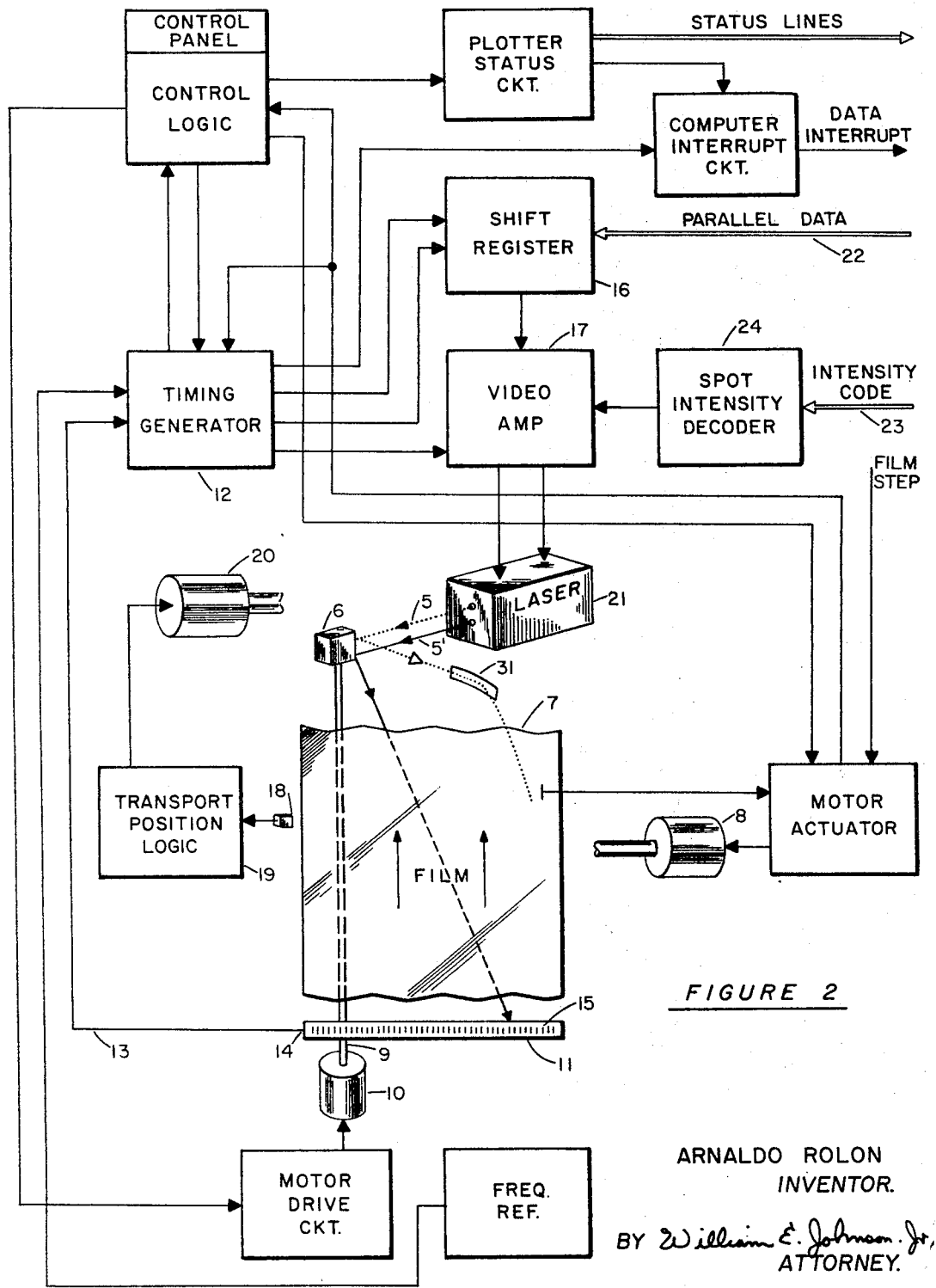

In FIGURE 2 the collimated beam 5 is caused to impinge upon the four-sided rotating mirror 6, the mirror being mounted on shaft 9 which is driven by the mirror drive motor 10. While the mirror 6 can have a number of sides other than four, a four-sided mirror makes a complete revolution in .032 second when coupled through shaft 9 to the A.C. motor 10 operating at 1,875 r.p.m., and in so doing, provides ease of illustration of the invention. The stepping motor 8 is synchronized with a rotating mirror so that one of the mirror flats causes the beam 5 to scan the film in .004 second; the film is advanced .005 inch during the next .004 second; and then the next mirror flat makes another scan of the film. Thus, in one complete revolution of the mirror 6, there are four lines of information from the beam 5 impinged upon the film 7. The film can be advanced at a faster pace, for example, .010 inch during the .004 second stepping interval if less resolution is required in the film. The film 7 in the preferred embodiment is 42 inches wide, with a 40 inch scan being used thereon. Thus, eight thousand 5 mil center dots can be placed on a single scan of the film. It should be appreciated, however, that lesser or greater width films likewise find utility within the scope of the invention.

The film for the laser 1 specified is photo-sensitive, for example, Kodak, Estarbase (Linagraph Recording Film). This film normally requires a developing process, but ultraviolet lasers are available which enable the use of "dry-write" film, requiring no development. Thus, it should be appreciated that lasers having different wave lengths for use with other types of film are within the scope and intent of the invention.

Likewise, light sources other than lasers which have "laser-like" characteristics; namely, collimated beams, are within the scope of the invention, for example, argon tubes, etc. However, the laser beam is a part of the preferred embodiment.

Figure 3:
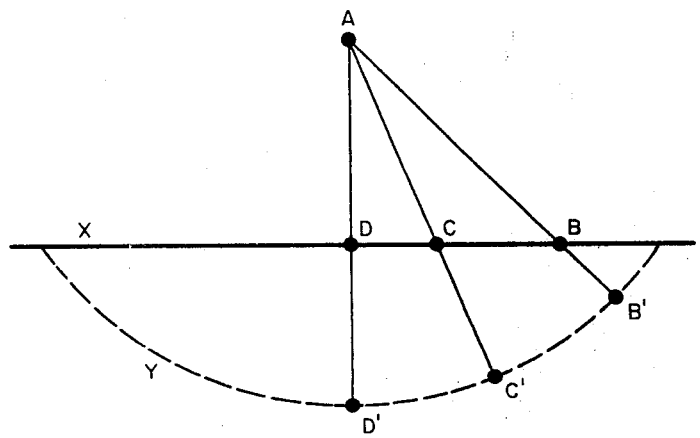
FIGURE 3 is a schematic diagram of the nonlinear effect of sweeping a flat surface with a rotating light source.

FIGURE 3 illustrates in a schematic diagram the nonlinear effect of sweeping a flat surface with a rotating light source. As is well known, angular velocity is a vector comprised of both speed and direction, and is thus constantly changing, since the direction is always changing. For ease of demonstration, assume that a light source emanates from point A in the form of a rotating beam having a constant rotating speed. Were it not for the flat plane X, the light would impinge upon the curved surface Y, for example, at points D', C', and B'. While the distance from D' to C' is the same as from C' to B', and as such, represents equal time segments, the distance from D to C is shorter than from C to B. It should therefore be appreciated that the directional change portion of the angular velocity vector causes a nonlinear effect when sweeping a flat surface.

Referring again to FIGURE 2, there is illustrated a combination of means for providing compensation for the abovedescribed nonlinear effect As the laser beam 5 strikes one of the flats of the mirror 6, it is caused to be reflected upon the parabolic mirror 31 and then onto the film 7, thus providing aplanatic light to the film 7. The aplanatic considerations will be discussed hereinafter in connection with FIGURE 5. There is also provided a beam timing bar 11 having a series of evenly spaced slots 15 therein. Although not illustrated as such in FIGURE 1, FIGURE 2 illustrates the laser beam as having two components, a controlled beam 5 and a continuous beam 5'. As the controlled beam 5 is caused to be swept across the film by the mirrors 6 and 31, beam 5' also is swept across the bar 11, passing through the slots 15. The light pulses from the beam 5' pass through the slots 15 down the length of the bar 11, where they impinge upon a photo diode 14, thus causing an electrical impulse to pass down line 13 into the timing generator 12. Since the slots 15 are evenly spaced, the nonlinear effect is lessened or substantially eliminated and the change in angular velocity of the sweep thus becomes negligible. A fiber optic system can be used as an alternative means for providing timing pulses to compensate for the nonlinear effect hereindescribed.

It should be appreciated that as the pulses from the bar 11, photo diode 14 and timing generator 12 enter the conventional shift register 16, they thereby gate the register 16 in such a manner that the computer information will pass through the video amplifier stage 17 and thus to laser unit 21. It should further be appreciated that even though the drive motor 10 rotates with varying degrees of consistency, the means thus illustrated and described, as well as the fiber optic system not illustrated, and also the memory drum system as illustrated and described with respect to FIGURE 4 hereinafter, provide a system whereby light dots can be placed on the film 7 with extreme accuracy and linearity. Of course, if desired, the means described could be modified to produce nonlinear spacing of the light information, such as, for example having nonlinear spacing of the slots 15 in the bar 11.

In the preferred embodiment of the invention, where a linear spacing of the light dots is desired, the system according to the invention operates as follows: If the computer indicates that a light dot should be available, the pulse for that dot remains ready in the shift register. To effect the proper positioning of the dot, a pulse from the compensation means and hence from the timing generator gates the shift register at the precise time to control the laser beam and thus position the dot. If the pulse from the timing generator arrives at the shift register and finds no dot information ready, the film will remain dark where the dot will otherwise appear. Using a linear spacing of the dots, any dots which thus appear on the film will be substantially even multiples of a given distance apart, "even" in this sense meaning whole or integral, as opposed to the fractional multiples of distances which would be present were it not for the compensation means according to the invention.

Figure 4:
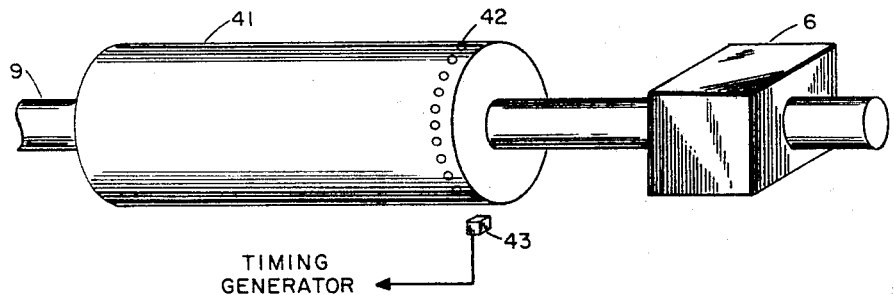
FIGURE 4 is a pictorial view of another embodiment of the invention providing means for compensating for the nonlinear effect of sweeping a flat film.

FIGURE 4 illustrates another means for generating the timing pulses to control the laser beam 5 according to a predetermined positional pattern. A magnetic memory drum 41, having a number of magnetic memory bits 42 mounted thereon, is mounted integrally with the mirror shaft 9 and mirror 6. Thus, the drum 41 and memory bits 42 rotate at the exact same frequency as does the mirror 6. As the memory bits 42, being determinably positioned and programmed in a conventional manner, rotate past a magnetic sensor 43, electrical pulses are sent to the timing generator 12 in FIGURE 2, which in turn gates the shift register 16 heretofore discussed. Although numerous and varied elaborate memory bit positioning arrangements could be illustrated and described, such are believed to be within the knowledge of the art. Suffice it to say, that the magnetic memory drum senses the rotation of the mirror 6 and causes pulses to trigger the timing generator, whereby a predetermined positioning of the light dots from the laser beam 5 is caused to be formed on the film 7, the dots preferably being spaced an even number of distances apart.

Thus there have been described three different means for compensating for the nonlinear effect of sweeping or scanning the flat surface with a rotating light source, in addition to the provision of a parabolic mirror between the rotating mirror 6 and the film 7. However, these are to be considered as merely exemplary and it is contemplated that other means will occur to one skilled in the art which are nonethless considered within the scope of the invention.

Referring again to FIGURE 2, the motor actuator circuit, in conjunction with the film position stepping motor 8, the film tracking sensor 18, the transport position logic circuitry 19 and transport position motor 20 provide a means for stepping the film 7 at the completion of each scan of the film by the laser beam 5. However, if desired, the film could be stepped after more than one scan to provide additional information of the film or to provide a measure of redudancy.

The computer data is fed through the line 22 in parallel form into the shift register 16, which is gated by the timing generator 12, as discussed above. The shift register has a serial output of pulses which are fed into the video amplifier 17, the video amplifier also being connected to the timing generator.

Once the circuitry above described has decided that a given location on the film is to receive a light dot, the system must then decide upon the intensity or shade of gray. The intensity code, usually in digital form coming from a computer, is fed through line 23 into a digital-to-analog converter 24, identified in the drawings as a spot intensity decoder. Thus the different analog voltages which emerge from the converter 24 into the video amplifier 17 determine the intensity of the light spots which appear on the film 7.

Figure 5:
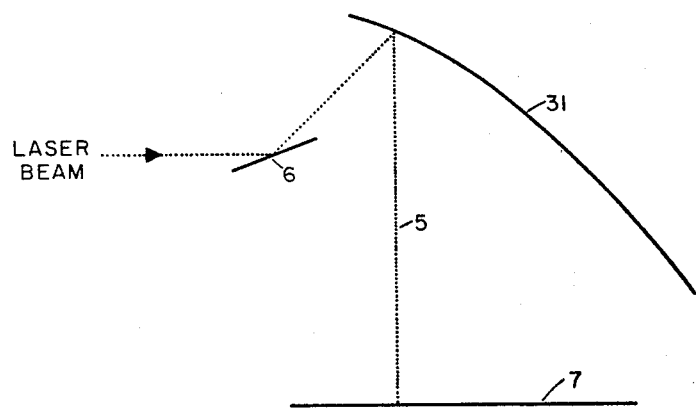
FIGURE 5 is a schematic view of the parabolic mirror for partially compensating for the nonlinear effect of sweeping the flat film, a rotating mirror, and a laser beam.

FIGURE 5 illustrates a schematic diagram of a parabolic mirror 31, wherein a mirror 6 is located at the focal point of the parabolic mirror 31. The laser beam 5 is seen to be reflected by the flat mirror 6 to the parabolic mirror 31 and to the film 7. It should be appreciated that the mirror 6 can have any number of flats or sides, for example, four, as was discussed in relation to FIGURE 2. Since the mirror 6 is located at the focal point, the distance from the focal point 2 to mirror 31 and then to the film 7 is a constant. Thus, as the mirror 6 rotates about the focal point and the lasser beam 5 is reflected to the film 7, the beams are aplanatic in character. For an infinitely precise focal point and a perfect parabolic mirror 31, a very precise spacing of the dots across the film 7 can be accomplished. However, the foregoing assumes that the light comes from the exact focal point of the mirror 31. This is a practical assumption since the mirror 6 can be made quite small in proportion to the size of the mirror 31, the sizes of the two mirrors being drawn out of proportion to their true sizes in order to better illustrate the invention. Thus, it should be appreciated that FIGURE 5 illustrates a means for providing aplanatic laser beams from the rotating mirror 6 to the film 7, thus providing a means for partially compensating for the nonlinear effects of sweeping a flat surface with a beam as above described.

What is claimed is:
1. A data plotter comprising:
 (a) data receiving means;
 (b) a collimated light source;
 (c) means for controlling said source as a function of said data;
 (d) a flat surfaced light sensitive film responsive to said source;
 (e) a rotating mirror for deflecting said source;
 (f) a parabolic mirror for again deflecting said source, whereby said source can be scanned across said film; and
 (g) timing means providing compensation for changes in the angular velocity of said collimated light source as said source is scanned across said film, whereby said timing means cooperate with the data to provide selectively positioned exposure of the film as the source is scanned across said film by said rotating mirror and said parabolic mirror.

References Cited
UNITED STATES PATENTS

| | | | |
|---|---|---|---|
| 425,270 | 4/1890 | Thompson | 346—108 |
| 2,136,486 | 11/1938 | Blondin | 350—6 |
| 3,015,535 | 1/1962 | Clark | 346—109 |
| 3,389,403 | 6/1968 | Cottingham et al. | 346—108 |

RICHARD B. WILKINSON, *Primary Examiner.*

JOSEPH W. HARTARY, *Assistant Examiner.*

U.S. Cl. X.R.

350—7